G. H. DUKE.
NUT LOCK.
APPLICATION FILED DEC. 17, 1914.

1,156,279.

Patented Oct. 12, 1915.

Witnesses
Einar Larson
Emily F. Camp

Inventor
George H. Duke
Attorneys

UNITED STATES PATENT OFFICE.

GEORGE H. DUKE, OF HOTCHKISS, COLORADO.

NUT-LOCK.

1,156,279. Specification of Letters Patent. Patented Oct. 12, 1915.

Application filed December 17, 1914. Serial No. 877,670.

*To all whom it may concern:*

Be it known that I, GEORGE H. DUKE, a citizen of the United States, residing at Hotchkiss, in the county of Delta and State of Colorado, have invented certain new and useful Improvements in Nut-Locks, of which the following is a specification.

This invention relates to that class of nut locks characterized by a locking member which is carried by the bolt and engages the top of the nut to prevent the latter from turning on the bolt.

The invention has for its object to provide a novel and improved locking member of the kind stated, which can be easily and quickly applied, and which is strong and durable.

A further object of the invention is to provide a locking member which is so constructed that it may be securely locked on the bolt, and which is also provided with means for preventing the nut from turning on the bolt.

The herein stated objects are attained by means of a combination and arrangement of parts to be hereinafter described and claimed, reference being had to the accompanying drawing in which—

Figure 1:
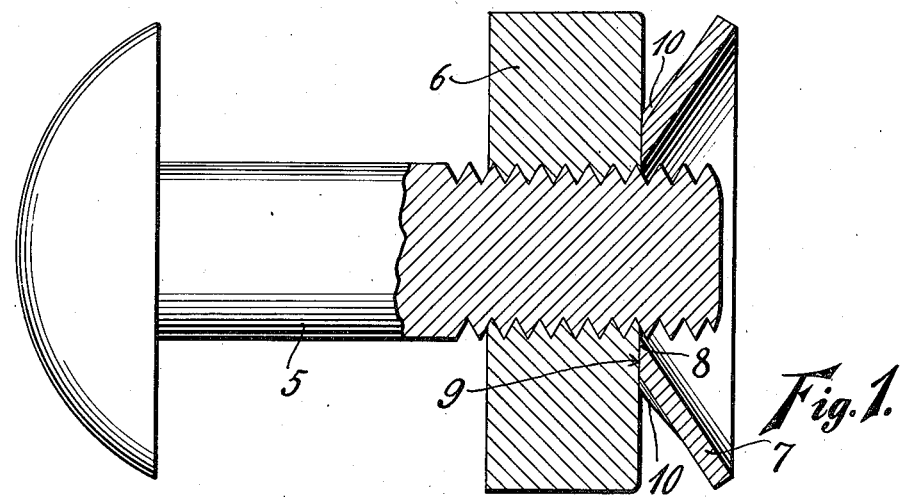
Figure 2:
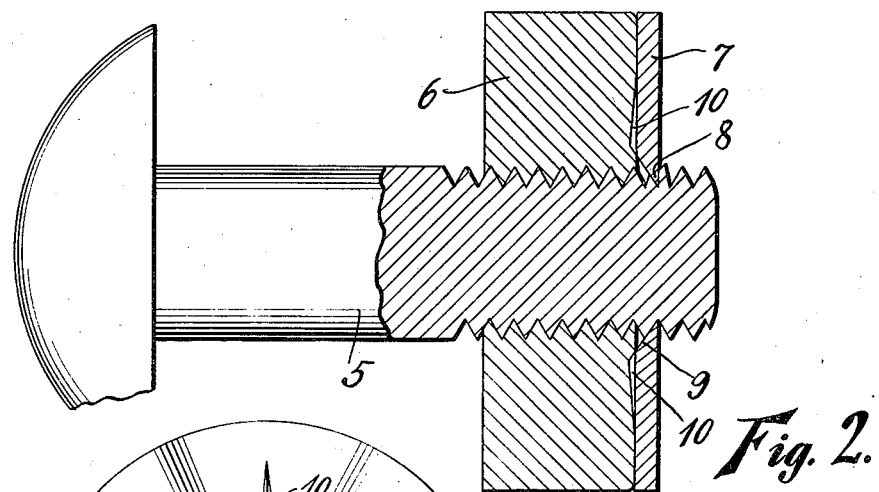
Figure 3:
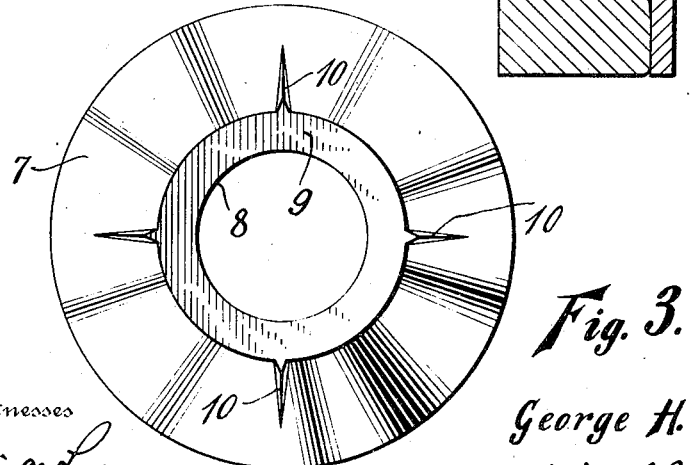

Figure 1 is a cross section showing the application of the invention and illustrating the position of the locking washer before it is placed in locking position; Fig. 2 is a sectional view showing the washer in locking position, and Fig. 3 is a plan view of the washer.

Referring specifically to the drawing, 5 denotes the shank of a bolt on which a nut 6 is screwed. The member for locking the nut on the bolt comprises a locking washer 7, which, before it is applied to the bolt, is conical or dished. The washer has a central orifice for the bolt shank, and the wall of this orifice is shaped to provide a sharp cutting edge 8 on the concave side of the washer. This cutting edge is made by trimming off, as indicated at 9, the apex of the washer on a straight line at a right angle to to its axis. The apex of the washer is thus left flat and parallel to the base of the washer, and in applying the washer to the bolt shank 5 it is placed so that the flattened portion 9 seats squarely against the top or outer face of the nut 6. The diameter of the central orifice of the washer corresponds to the diameter of the bolt shank. The washer 7 being placed on the bolt shank 5 against the nut 6, as described, after the latter is screwed home, a hollow punch or other suitable tool is placed over the bolt and against the concave side of the washer, and then with a stroke of a hammer the washer is flattened out against the top or outer face of the nut. As the washer flattens out, its orifice contracts, and the sharp edge 8 bites into and across the thread of the bolt shank, whereby the washer is securely locked on the bolt shank and prevented from turning off the same. On the convex side of the washer 7 are sharp ridges 10 extending radially from the central orifice. These ridges are driven into the nut 6 when the washer is flattened out as hereinbefore described, whereby the nut is prevented from turning on the bolt 5. As the cutting edge 8 is on the outer side of the washer, it cuts into the thread of the bolt shank 5 and crowds the washer 7 toward the nut 6, to embed the ridges 10 in the latter. The flattening out of the washer brings the portion 9 of the washer inward to form the wall of the orifice through which the bolt shank passes, said wall sloping inward to the edge 8, the latter being at the outer face of the washer. By thus locating the cutting edge a maximum strength is obtained. The continuity of the cutting edge is uninterrupted and it cannot fail to bite across and into the thread of the bolt shank, as it cannot take the same angle as said thread, and the only way to remove the washer is to cut the same off the bolt shank.

I claim:—

1. A nut lock washer which is dished before application, and has a bolt orifice, the wall of the orifice being shaped to produce a continuous cutting edge on the concave side of the washer.

2. A nut lock washer which is dished before application, and has a bolt orifice, the wall of the orifice being shaped to produce a cutting edge on the concave side of the washer, said cutting edge being continuous and extending transversely of the threads of the bolt receiving the washer.

3. A nut lock washer which is dished before application and has a bolt orifice, the apex of the washer being trimmed off in a plane parallel to the base of the washer to produce a cutting edge on the concave side of the washer.

4. A nut lock washer which is dished before application and has a bolt orifice, the apex of the washer being trimmed off in a plane parallel to the base of the washer to produce a cutting edge on the concave side of the washer, said cutting edge being continuous and extending around the bolt shank receiving the washer, and transversely of the threads of said bolt shank.

5. A nut lock washer which is dished before application, and has a bolt orifice, the wall of the orifice being shaped to produce a cutting edge on the concave side of the washer, and nut-engaging ridges on the convex side of the washer.

In testimony whereof I affix my signature in presence of two witnesses.

GEORGE H. DUKE.

Witnesses:
P. A. MANZANARES,
AGAPITO PACHECO.